US009047037B2

(12) United States Patent
Imagawa

(10) Patent No.: US 9,047,037 B2
(45) Date of Patent: Jun. 2, 2015

(54) STORAGE MEDIUM STORING INSTRUCTIONS FOR INFORMATION PROCESSING APPARATUS AND PRINT CONTROL APPARATUS MAINTAINING SHARED PRINTING CONDITIONS ACROSS APPLICATION PROGRAMS

(71) Applicant: BROTHER KOGYO KABUSHIKI KAISHA, Nagoya-shi, Aichi-ken (JP)

(72) Inventor: Kayo Imagawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/026,714

(22) Filed: Sep. 13, 2013

(65) Prior Publication Data

US 2014/0085653 A1    Mar. 27, 2014

(30) Foreign Application Priority Data

Sep. 27, 2012  (JP) ................................. 2012-214538

(51) Int. Cl.
*G06F 3/12* (2006.01)
(52) U.S. Cl.
CPC ............ *G06F 3/1297* (2013.01); *G06F 3/1204* (2013.01); *G06F 3/1257* (2013.01); *G06F 3/1285* (2013.01)
(58) Field of Classification Search
CPC ... G06F 3/1204; G06F 3/1257; G06F 3/1285; G06F 3/1297; G06F 3/122

USPC ........................ 358/1.13, 1.14, 1.9, 1.15, 1.16
See application file for complete search history.

(56) References Cited

U.S. PATENT DOCUMENTS

| 8,335,008 B2 * | 12/2012 | Yoshida ....................... 358/1.15 |
| 2012/0002221 A1 * | 1/2012 | Zhan .............................. 358/1.9 |
| 2012/0105890 A1 * | 5/2012 | Furuya .......................... 358/1.13 |

FOREIGN PATENT DOCUMENTS

JP           2011-170506 A       9/2011

* cited by examiner

*Primary Examiner* — Benny Q Tieu
*Assistant Examiner* — Juan M Guillermety
(74) *Attorney, Agent, or Firm* — Merchant & Gould PC

(57) ABSTRACT

A medium stores computer-executable instructions. In a case that a display instruction of a print setting screen is outputted by a first application program executed by an information processing apparatus, the instructions cause the information processing apparatus to perform: a display process for displaying the print setting screen on a display section; and a storage judgment process for judging whether a shared printing condition shared by different application programs is stored in a predetermined storage section. In a case that it is judged that the shared printing condition is not stored in the predetermined storage section, the instructions cause the information processing apparatus to perform: a shared printing condition accepting process for accepting setting of a new shared printing condition; and a storage process for storing the new shared printing condition and identification information of the first application program in the predetermined storage section being correlated with each other.

15 Claims, 9 Drawing Sheets

STORAGE MEDIUM STORING INSTRUCTIONS FOR INFORMATION PROCESSING APPARATUS AND PRINT CONTROL APPARATUS MAINTAINING SHARED PRINTING CONDITIONS ACROSS APPLICATION PROGRAMS

CROSS REFERENCE TO RELATED APPLICATION

The present application claims priority from Japanese Patent Application No. 2012-214538, filed on Sep. 27, 2012, the disclosure of which is incorporated herein by reference in its entirety.

BACKGROUND OF THE INVENTION

1. Field of the Invention

The present invention relates to a technique in which printing is performed by different application programs using the same printing condition.

2. Description of the Related Art

There has been conventionally disclosed a technique in which a print setting screen is displayed by a printer driver called from an application program and printing is performed by using a value set in the print setting screen (see, for example, Japanese Patent Application laid-open No. 2011-170506). Further, for example, regarding WINDOWS (trade name) which is an operating system (OS) produced by Microsoft Corporation, in a case that an application program same as the application program for which the above value is set is executed multiply, the value is shared in the application program executed multiply.

In some cases, the same printing condition is desired to be used in different application programs. The printing condition, however, has not been conventionally shared in the different application programs. Therefore, in a case that the same printing condition is desired to be used in different application programs, a user needs to set the same printing condition by displaying a print setting screen for each of the application programs, which is a burden of operation for the user.

In the present description, it is disclosed a technique in which a burden to a user is decreased in a case that printing is performed by different application programs using the same printing condition.

SUMMARY OF THE INVENTION

According to an aspect of the present teaching, there is provided a non-transitory computer-readable medium storing computer-executable instructions that, when executed by a processor, cause an information processing apparatus configured to be communicable with a printing apparatus, to: perform a display process for displaying a print setting screen on a display section provided for the information processing apparatus, in a case that a display instruction of the print setting screen is outputted by a first application program executed by the information processing apparatus; perform a storage judgment process for judging whether a shared printing condition, which is a printing condition shared by different application programs, is stored in a predetermined storage section, in the case that the display instruction of the print setting screen is outputted by the first application program; perform a shared printing condition accepting process for accepting setting of a new shared printing condition in the print setting screen, in a case that it is judged in the storage judgment process that the shared printing condition is not stored in the predetermined storage section; perform a storage process for storing the new shared printing condition accepted in the shared printing condition accepting process and identification information of the first application program in the predetermined storage section being correlated with each other; perform an application judgment process for judging whether a second application program identified by the identification information, which is stored in the predetermined storage section being correlated with the shared printing condition, is different from the first application program, in a case that it is judged in the storage judgment process that the shared printing condition is stored in the predetermined storage section; and perform a shared printing condition setting process for setting the shared printing condition stored in the predetermined storage section in the print setting screen, in a case that it is judged in the application judgment process that the second application program is different from the first application program.

According to the computer-executable instructions stored in the medium, the shared printing condition accepted by the print setting screen and the identification information of the application program which has given the instruction for displaying the print setting screen are stored in the predetermined storage section being correlated with each other, and in a case that display of the print setting screen is instructed from another application program different from the application program identified by the identification information, the shared printing condition stored in the predetermined storage section is set in the print setting screen displayed by the instruction from the another application program. Accordingly, it is possible to reduce a burden to a user in a case of performing the printing by different application programs using the same printing condition.

DESCRIPTION OF THE PREFERRED EMBODIMENTS

[First Embodiment]

Figure 1:
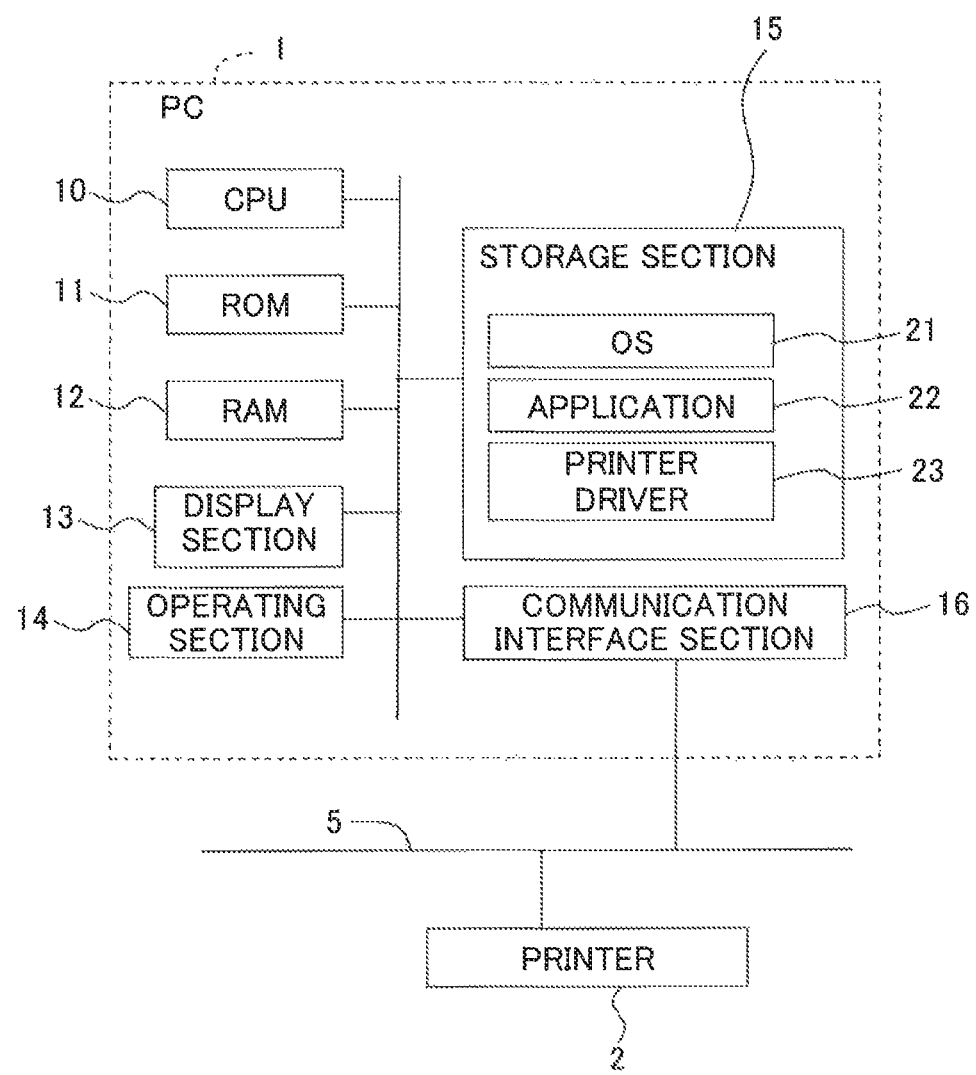
FIG. 1 schematically and simplistically shows an electrical configuration of PC according to the first embodiment.

An explanation will be made about the first embodiment with reference to FIG. 1 to FIG. 7. At first, with reference to FIG. 1, an explanation will be made about an electrical configuration of a personal computer (referred to as PC) 1 as an information processing apparatus and a print control apparatus according to the first embodiment. The PC 1 includes a CPU 10, a ROM 11, a RAM 12, a display section 13, an operating section 14, a storage section 15, and a communication interface section 16.

The CPU 10 controls the sections of the PC 1 by executing programs stored in the ROM 11 and/or the storage section 15. Programs, various data, and the like to be executed by the CPU 10 are stored in the ROM 11. The RAM 12 is utilized as a main storage device for executing various processes by the CPU 10. The CPU 10 is an example of a processing section. The storage section 15 is an example of a predetermined storage section.

The display section 13 is configured to include a display device such as a liquid crystal display, a display driving circuit driving the display device, and the like. The operating section 14 is constructed of a keyboard, a mouse, an interface to which the keyboard and the mouse are connected, etc.

The storage section 15 is a device utilizing a nonvolatile memory such as a hard disk and a flush memory, to store various programs and data. In the storage section 15, an operating system (referred to as an OS) 21, a plurality of application programs different from one another (referred to as applications) 22, a printer driver 23 which controls a printer 2, etc., are stored. The programs are executed by the CPU 10. The printer driver 23 is an example of computer-executable instructions, that is, a printing control program. The printer driver 23 is stored in the storage section 15 by installing a printer driver stored in a recording medium such as a CD-ROM or a printer driver stored in a sever or the like on a network.

The communication interface section 16 is an interface for communicating with an external device such as the printer 2, via Local Area Network (LAN) and/or a communication network 5 such as the Internet. The communication interface section 16 may be configured to be connected to the printer 2 by Universal Serial Bus (USB) and/or IEEE1284 which is the communication standard for a printer. Further, the communication interface section 16 may communicate with the external device via a cable (wire communication), or may communicate with the external device wirelessly.

<Printer>

The printer 2 is an apparatus to print an image on a printing paper sheet in an electro-photographic type or an ink-jet type.

<Print Setting Screen>

Subsequently, with reference to FIG. 2, an explanation will be made about a print setting screen 31 displayed by the printer driver 23. The user selects a printer on a printing screen 30 displayed by the application 22 and clicks on a property button 30a, thereby making it possible to instruct the printer driver controlling the selected printer to display the print setting screen 31. Here it is assumed that a printer A is selected and display of the print setting screen 31 is instructed.

In a case that the display of the print setting screen 31 is instructed, the printer driver 23 controlling the printer A displays the print setting screen 31 on the display section 13. The print setting screen 31 shown in FIG. 2 is constructed of four tab screens including a basic setting tab 32, an extended capability tab 33, a shared setting tab 34, and a maintenance tab 35. The shared setting tab 34 is an example of a screen in which setting of a shared printing condition is accepted. The basic setting tab 32, the extended capability tab 33, and the maintenance tab 35 are each examples of a screen in which setting of any printing condition other than the shared printing condition is accepted.

Print setting items, such as a print run 32a, a direction of printing paper 32b, a paper size 32c, a single-sided/double-sided printing 32d, a color-monochrome printing 32e, a Nin1 printing 32f, and a paper tray selection 32g, are displayed in the basic setting tab 32. In the Nin1 printing, printing is performed by allocating a plurality of images uniformly on one surface of one printing paper sheet.

Subsequently, with reference to FIG. 3, an explanation will be made about the shared setting tab 34. The shared setting tab 34 is a tab for setting the shared printing condition, which is a printing condition shared by different applications 22. Items, such as a "(Shared setting) non-use" 34a, a watermark setting (for internal use only) 34b, a watermark setting (confidential) 34c, a watermark setting (copy) 34d, a watermark setting (draft) 34e, a double-sided printing 34f, a current date printing 34g, an ID printing 34h, and a monochrome printing (not shown in FIG. 3), are displayed in the shared setting tab 34.

The user can switch enabling/disabling of each of the items by clicking on each of the items. In FIG. 3, each of the items in the enabling state is hatched. In a case that an item in the enabling state is clicked on, the printer driver 23 disables the item; and in a case that an item in the disabling state is clicked on, the printer driver 23 enables the item. Hereinbelow, an explanation will be made about each of the items.

The "(shared setting) non-use" 34a is an item through which the user selects whether to set the shared printing condition. The watermark setting (for internal use only) 34b is a printing condition selected when watermark-printing of a string of characters "For internal use only" is desired. The same is true on the watermark setting (confidential) 34c, the watermark setting (copy) 34d, and the watermark setting (draft) 34e.

The double-sided printing 34f is a printing condition selected when the image is desired to be printed on both surfaces of the printing paper sheet. The double-sided printing can be set also in the basic setting tab 32. For example, in a case that the single-sided printing is set, as a setting value of the single-sided/double-sided printing 32d, in the basic setting tab 32 and that the double-sided printing 34f is enabled in the shared setting tab 34, the double-sided printing 34f is given priority over the single-sided printing. In a case that the double-sided printing 34f is enabled, the setting value of the single-sided/double-sided printing 32d in the basic setting tab 32 may be set as the double-sided printing in cooperation with the setting of the double-sided printing 34f. The same is true on the monochrome printing.

The current date printing 34g is a printing condition selected when the current date is desired to be printed, for example, in the header of the printing paper sheet. The ID printing 34h is a printing condition selected when a user ID of the user ordering the printing is desired to be printed. As the user ID, it is possible to use, for example, a user ID used when the user logged in the OS 21. The unillustrated monochrome printing is a printing condition selected when the monochrome printing is desired to be performed. The items displayed in the shared setting tab 34 as the printing conditions are not limited to those as described above. The printing condition(s) to be displayed in the shared setting tab 34 can be determined as appropriate.

The shared printing condition can be set by setting enabling/disabling of each of the printing conditions in the shared setting tab 34 by the user. The process, in which the printer driver 23 displays the shared setting tab 34 to accept the setting of the shared printing condition, is an example of a process for accepting the shared printing condition.

Further, a setting item "Shared setting tab is always displayed first" 34j is also displayed in the shared setting tab 34. In a case that the "Shared setting tab is always displayed first" 34j is enabled, the shared setting tab 34 is displayed first when the print setting screen 31 is displayed next time. In a case that the "Shared setting tab is always displayed first" 34*j* is disabled, the basic setting tab 32 is displayed first when the print setting screen 31 is displayed next time.

In a case that an OK button 31*a* is clicked on the print setting screen 31, the printer driver 23 performs the following two processes and then closes the print setting screen 31. The first process is a process in which the printing condition stored in the RAM 12 is overwritten with the printing condition set in the print setting screen 31. The printing condition stored in the RAM 12 is used as the printing condition when the image outputted from the application is printed. Printing condition(s) representing default printing condition(s) set in the printer driver 23 is stored in the RAM 12 by the printer driver 23, and the printing condition representing the default printing condition is overwritten with the printing condition set in the print setting screen 31. Here, the printing condition representing the default printing condition is stored in the RAM 12 for each of the applications 22 by the printer driver 23. Thus, in a case that each of the applications 22 is different, "each of the printing conditions stored in the RAM 12" to be overwritten with another printing condition is also different.

In a case that there is printing condition(s) enabled in the shared setting tab 34, the printing condition stored in the RAM 12 is overwritten also with the printing condition enabled in the shared setting tab 34, in addition to the printing condition(s) set in the tabs (the basic setting tab 32, the extended capability tab 33, and the maintenance tab 35) other than the shared setting tab 34. In a case that the shared printing condition conflicts with any other printing condition(s), the printer driver 23 gives priority to the shared printing condition.

The second process is a process in which the shared printing condition set in the shared setting tab 34 is stored in the storage section 15. In particular, the printer driver 23 judges as to whether or not the "(shared setting) non-use" 34*a* is enabled or disabled. In a case that the "(shared setting) non-use" 34*a* is disabled, the printing condition enabled in the shared setting tab 34 is stored in the storage section 15 as the shared printing condition. Then, the printer driver 23 stores, in the storage section 15, identification information of the application 22 instructing the printer driver 23 to display the print setting screen 31 while being correlated with the shared printing condition. The identification information of the application 22 is obtained by a request to the OS 21. For example, an application name can be used as the identification information of the application 22. On the other hand, in a case that the "(shared setting) non-use" 34*a* is enabled, neither the shared printing condition nor the identification information is stored in the storage section 15 by the printer driver 23.

Although details will be described later, the shared printing condition is stored in the storage section 15 only when no shared printing condition is stored in the storage section 15. Further, the shared printing condition can be set in the shared setting tab 34 only when no shared printing condition is stored in the storage section 15 when the display of the print setting screen 31 is instructed by the application 22.

In a case that a cancel button 31*b* is clicked on the print setting screen 31, the printer driver 23 cancels the setting value set in the print setting screen 31 and closes the print setting screen 31. In this case, when the printing is performed, the default printing condition is used.

Figure 2:
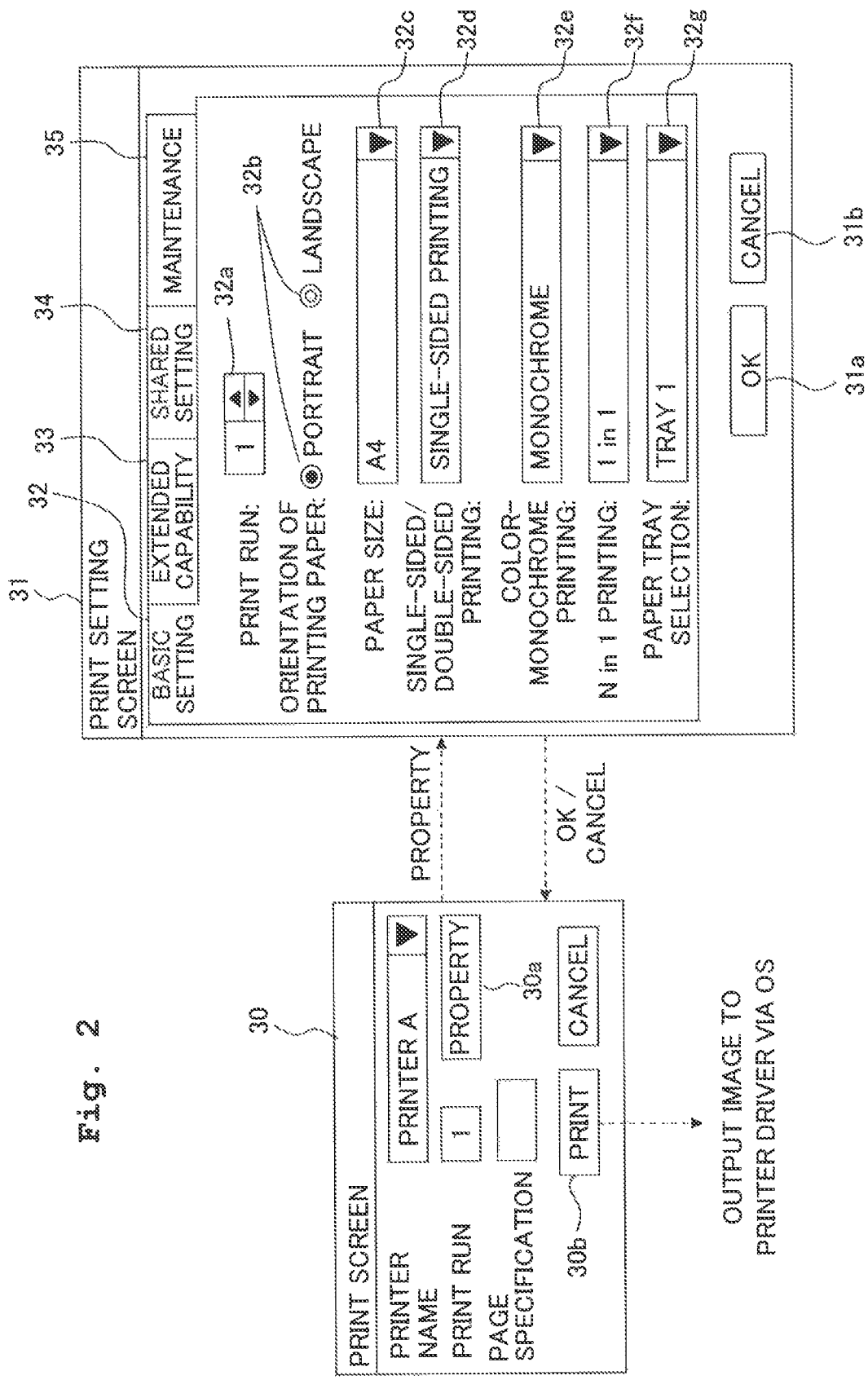
FIG. 2 schematically shows a print setting screen.

Returning to the description of FIG. 2, in a case that a printing button 30*b* is clicked on the printing screen 30 by the user, the application 22 instructs the printer driver 23 to print a to-be printed image by outputting the to-be printed image to the printer driver 23 via the OS 21. In a case that the image is outputted from the application 22, the printer driver 23 generates a printing job based on the outputted image and the printing condition stored in the RAM 12 and outputs the generated printing job to the printer A.

<Sharing of Shared Printing Condition>

Figure 4:
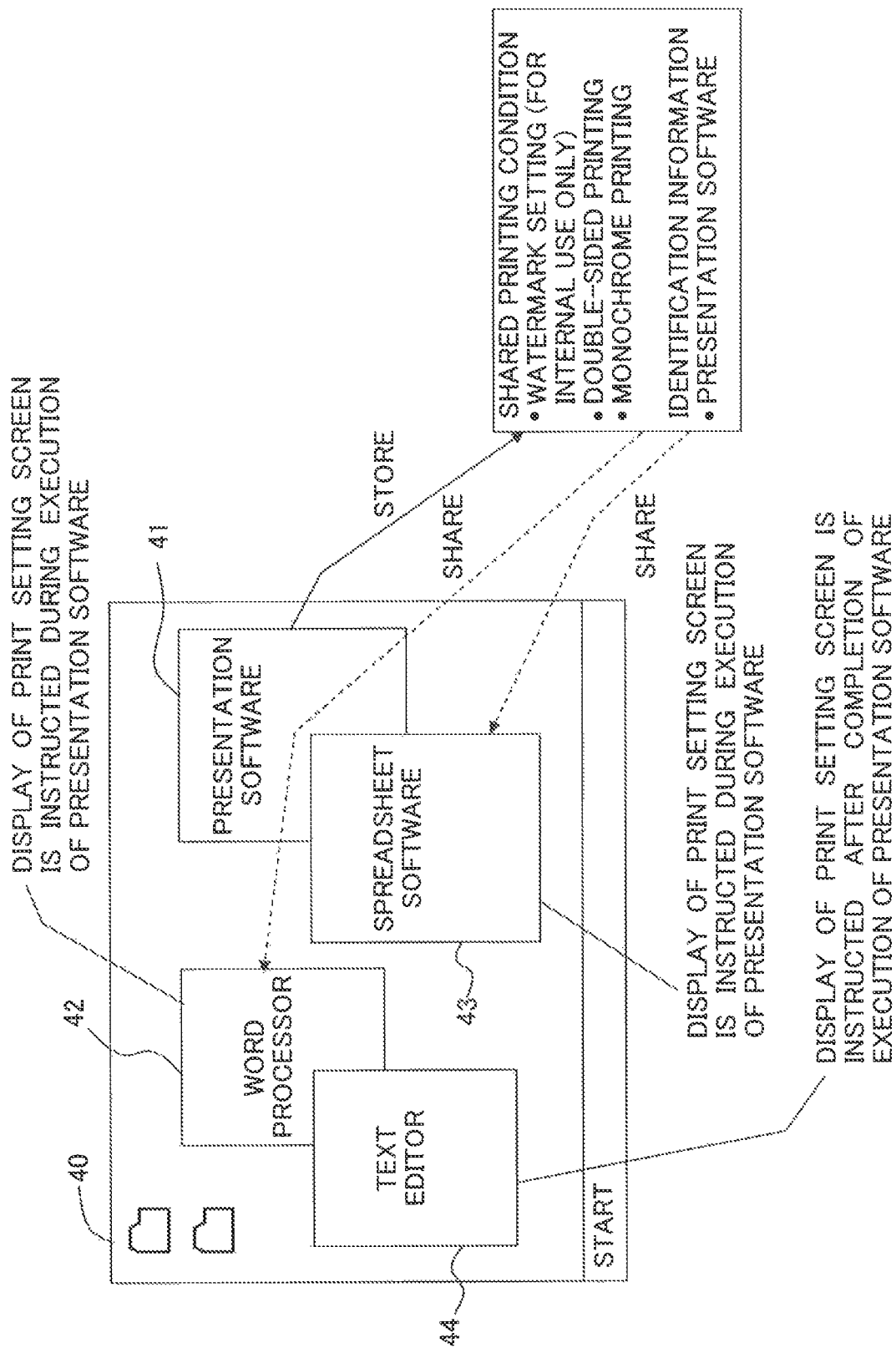
FIG. 4 is a schematic view for explaining sharing of a shared printing condition.

Subsequently, with reference to FIG. 4, sharing of the shared printing condition will be explained. Here, an explanation will be made by citing a presentation software, a word processor, a spreadsheet software, and a text editor, as examples of the applications 22. In FIG. 4, a screen 41 displayed by the presentation software, a screen 42 displayed by the word processor, a screen 43 displayed by the spreadsheet software, and a screen 44 displayed by the text editor are displayed on a desktop 40, which is displayed on the display section 13 by the OS 21. Here, it is assumed that the user desires to use the same printing condition in the presentation software, the word processor, and the spreadsheet software and that the user does not desire to use said same printing condition in the text editor.

<Case in which No Shared Printing Condition is Stored>

For example, it is assumed that the presentation software is executed in a state that no shared printing condition is stored in the storage section 15. Then, it is assumed that the display of the print setting screen 31 is instructed from the presentation software. In this case, since no shared printing condition is stored in the storage section 15, the user is capable of setting the shared printing condition in the shared setting tab 34. Then, in a case that the OK button 31*a* is clicked on the print setting screen 31, the printer driver 23 stores, in the storage section 15, the shared printing condition set in the shared setting tab 34 and stores, in the storage section 15, the identification information of the presentation software while being correlated with the shared printing condition.

<Case in which Shared Printing Condition is Stored>

Subsequently, it is assumed that the display of the print setting screen 31 is instructed from the word processor in a state that the shared printing condition, which has been set in the print setting screen 31 displayed upon the instruction from the presentation software, is stored in the storage section 15.

In this case, the printer driver 23 sets, in the shared setting tab 34 of the print setting screen 31 displayed upon the instruction from the word processor, the shared printing condition stored in the storage section 15. Accordingly, the shared printing condition is shared by the presentation software and the word processor. Here, executing the setting of the shared printing condition in the shared setting tab 34 refers to, for example, the following cases: in a case that the watermark setting (for internal use only) is set in the shared printing condition stored in the storage section 15, the watermark setting (for internal use only) 34*b* is enabled in the shared setting tab 34; and in a case that the double-side printing is not set in the shared printing condition, the double-sided printing 34*f* is disabled in the shared setting tab 34.

Figure 5:
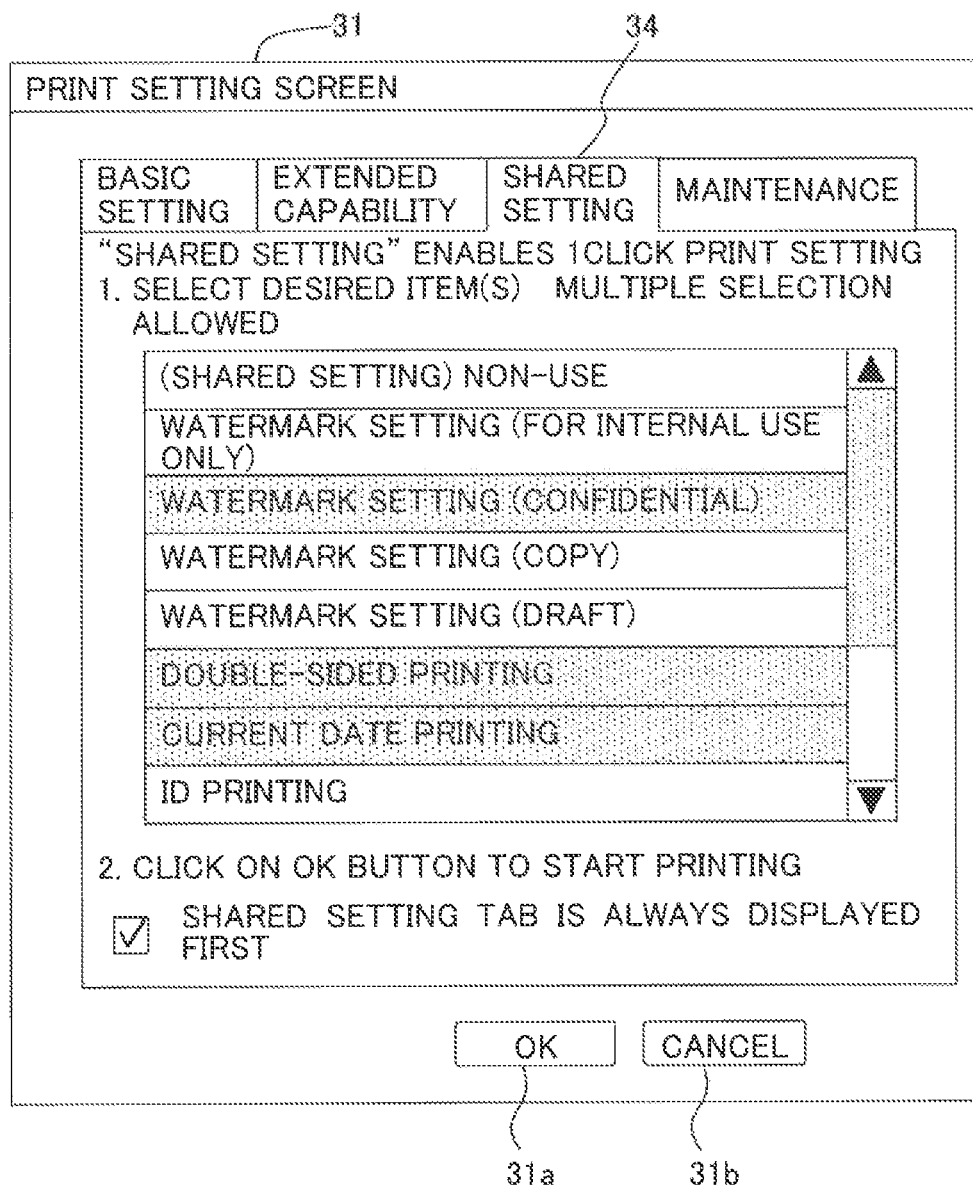
FIG. 5 schematically shows the shared setting tab.

However, as shown FIG. 5, in the case that the shared printing condition is shared, the shared setting tab 34 of the print setting screen 31 displayed upon the instruction from the word processor is entirely displayed grayed-out by the printer driver 23, and thereby change of the shared printing condition shared by the presentation software and the word processor is prohibited. In FIG. 5, the area displayed grayed-out is entirely displayed in a light color. However, even when the area is displayed grayed-out, the user is capable of identifying the enabled printing condition.

The reason why the change of the shared printing condition shared by the plurality of applications is prohibited is to prevent the following situation. That is, in a case that the user desires to use the same printing condition in different applications, the user erroneously changes the shared printing condition in the shared setting tab 34 and thereby the same printing condition can not be used in the different applications.

In a case that the user clicks on the OK button 31*a* on the print setting screen 31 displayed upon the instruction from the word processor, the printer driver 23 writes, in the printing condition stored in the RAM 12, the printing condition set in the print setting screen 31. In this case, however, since the shared printing condition, which is set in the print setting screen 31 displayed upon the instruction from the presentation software, is stored in the storage section 15, the printer driver 23 does not store, in the storage section 15, the shared printing condition set in the shared setting tab 34.

<Completion of Sharing of Shared Printing Condition>

The shared printing condition is shared during only the period in which the application 22, which is identified by the identification information stored while being correlated with the shared printing condition, is executed. For example, it is assumed that the display of the print setting screen 31 is instructed from the text editor after execution of the presentation software is completed. In this case, the printer driver 23 judges that a sharing period of the shared printing condition is completed, and the printer driver 23 does not set, in the shared setting tab 34, the shared printing condition stored in the storage section 15 and deletes the shared printing condition from the storage section 15. Therefore, the shared printing condition is not shared in the text editor.

That is, in a case that the user desires to share the shared printing condition set in the print setting screen 31 displayed upon the instruction from the presentation software in the word processor and the spreadsheet software, the presentation software is left to be executed purposefully at least until the display of the print setting screen 31 is instructed from each of the word processor and the spreadsheet software. Accordingly, the shared printing condition can be shared by these applications.

On the other hand, in a case that the user does not desire to share the shared printing condition in the text editor, the user can prevent the shared printing condition from being shared in the text editor as follows. That is, the user closes the presentation software before the instruction of the display of the print setting screen 31 from the text editor, or the user instructs the printer driver 23 to perform the printing without the instruction of the display of the print setting screen 31 from the text editor.

In a case that no shared printing condition is shared, that is, in a case that the shared printing condition stored in the storage section 15 is not set in the shared setting tab 34, the printer driver 23 does not display the shared setting tab 34 as the grayed-out. Therefore, the user is capable of setting the shared printing condition in the print setting screen 31 displayed upon the instruction from the text editor.

<Process of Printer Driver>

Figure 6:
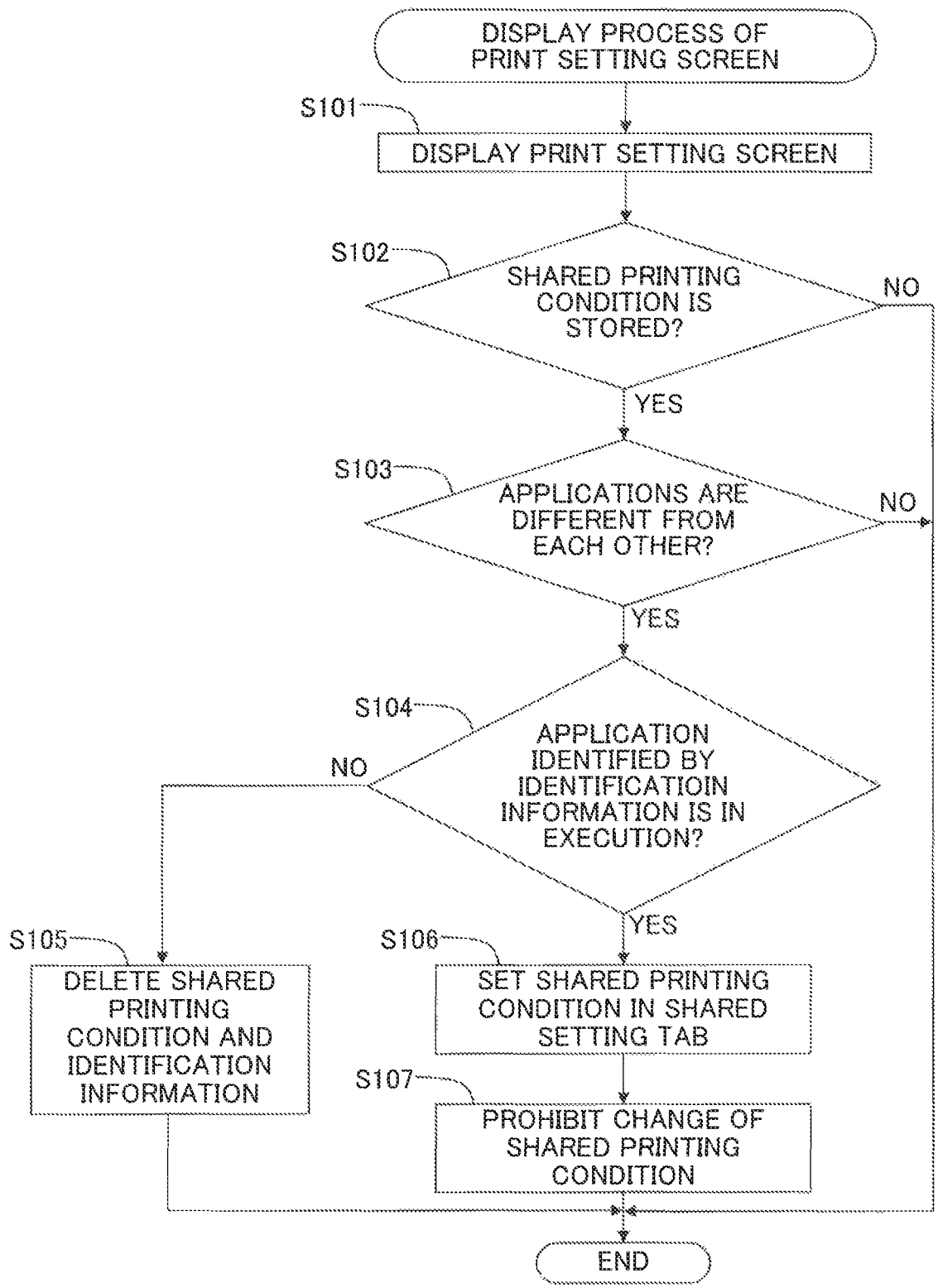
FIG. 6 is a flowchart showing a display process of the print setting screen.
Figure 7:
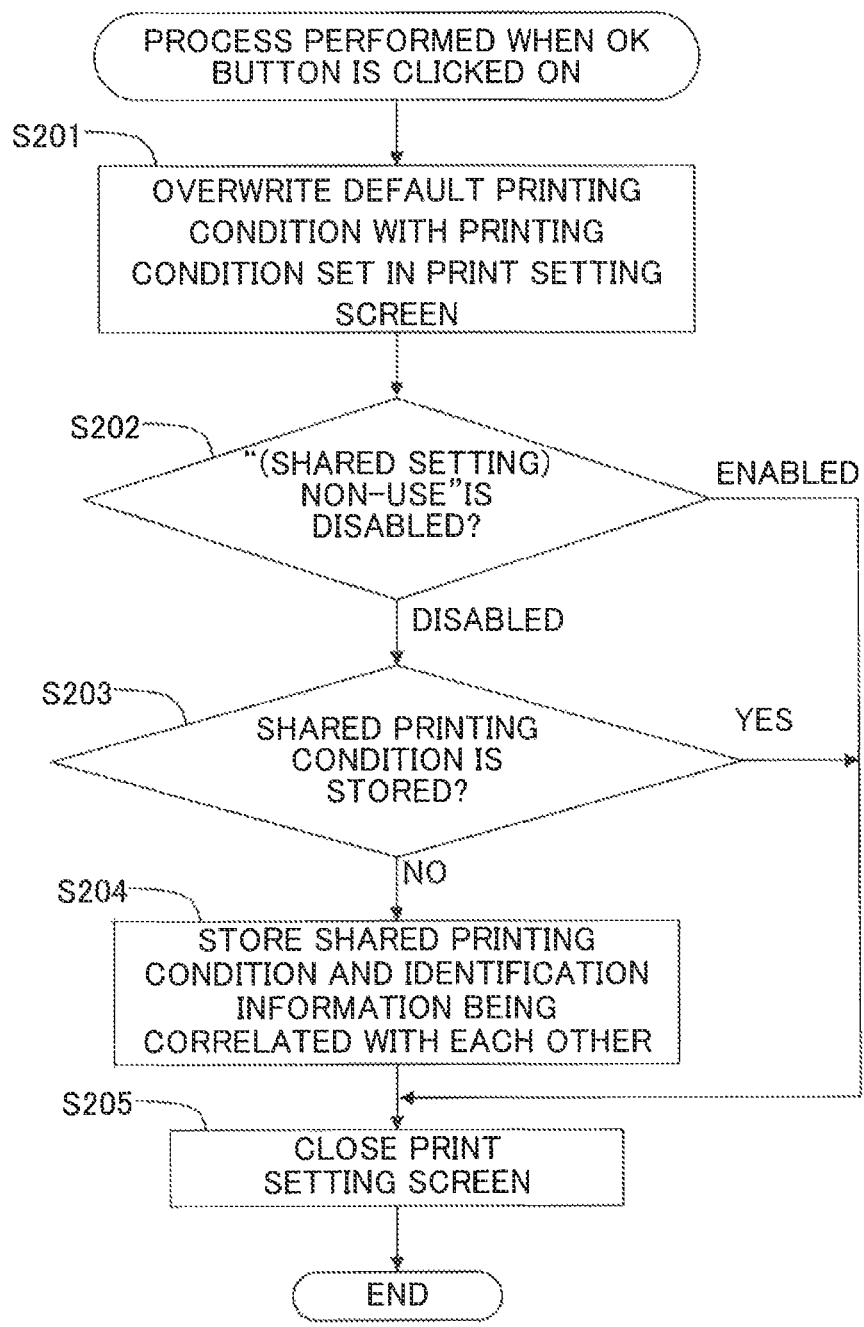
FIG. 7 is a flowchart showing a process of a printer driver when an OK button is clicked on the print setting screen.

Subsequently, an explanation will be made about a process of the printer driver 23 with reference to the flowchart of FIG. 6.

<Display Process of Print Setting Screen>

At first, an explanation will be made about a display process of the print setting screen with reference to FIG. 6. The display process is started when the display of the print setting screen 31 is instructed from the application 22.

In S101, the printer driver 23 displays the print setting screen 31 on the display section 13. S101 is an example of the display process.

In S102, the printer driver 23 judges as to whether or not the shared printing condition is stored in the storage section 15. In a case that the shared printing condition is stored in the storage section 15, the process proceeds to S103. In a case that the shared printing condition is not stored in the storage section 15, the process is completed. S102 is an example of a storage judgment process and a first storage judgment process. Noted that the process in S102 is a process until the print setting screen 31 is displayed. Even when the process in S102 is completed, the print setting screen 31 remains displayed. The user is capable of setting the printing condition in the displayed print setting screen 31.

In S103, the printer driver 23 judges as to whether or not the application 22 instructing the printer driver 23 to display the print setting screen 31, is different from the application 22 identified by the identification information stored in the storage section 15 being correlated with the shared printing condition. In a case that these applications 22 are different from each other, the process proceeds to S104. In a case that these applications 22 are the same application, the process is completed. S103 is an example of an application judgment process.

In S104, the printer driver 23 judges as to whether or not the application 22, which is identified by the identification information correlated with the shared printing condition, is in execution. In a case that the application 22 is not in execution, it is judged that the sharing period of the shared printing condition is completed and the process proceeds to S105. In a case that the application 22 is in execution, it is judged that the sharing period of the shared printing condition is not yet completed and the process proceeds to S106. S104 is an example of an execution judgment process.

In S105, the printer driver 23 deletes the shared printing condition and the identification information stored in the storage section 15. S105 is an example of a deletion process. In S106, the printer driver 23 sets, in the shared setting tab 34 of the print setting screen 31, the shared printing condition stored in the storage section 15. S106 is an example of a shared printing condition setting process. In S107, the printer driver 23 displays the shared setting tab 34 as the grayed-out to prohibit the change of the shared printing condition. S107 is an example of a prohibition process.

<Process Performed when OK Button is Clicked on Print Setting Screen>

Subsequently, an explanation will be made about a process of the printer driver 23 performed when the OK button 31*a* is clicked on the print setting screen 31.

In S201, the printing condition stored in the RAM 12 is overwritten with the printing condition set in the print setting screen 31 by the printer driver 23. The printing condition set in the print setting screen 31 also includes the shared printing condition. In S202, the printer driver 23 judges as to whether or not the "(shared setting) non-use" 34*a* is disabled. In a case that the "(shared setting) non-use" 34*a* is disabled, that is, in a case that the shared printing condition is shared, the process proceeds to S203. In a case that the "(shared setting) non-use" 34*a* is enabled, the process proceeds to S205.

In S203, the printer driver 23 judges as to whether or not the shared printing condition is stored in the storage section 15. In a case that no shared printing condition is stored in the storage section 15, the process proceeds to S204. In a case that the shared printing condition is stored in the storage section 15, the process proceeds to S205. For example, in the above example, in a case that the application 22 instructing the printer driver 23 to display the print setting screen 31 is the presentation software, it is judged that no shared printing condition is stored in the storage section 15. On the other hand, in a case that the application 22 instructing the printer driver 23 to display the print setting screen 31 is the word processor, since the shared printing condition set in the print setting screen 31 displayed upon the instruction from the presentation software is stored in the storage section 15, it is judged that the shared printing condition is stored.

In S204, the printer driver 23 stores, in the storage section 15, the shared printing condition set in the shared setting tab 34 and the identification information of the application 22 instructing the printer driver 23 to display the print setting screen 31, while being correlated with each other. S204 is an example of a storage section. In S205, the printer driver 23 closes the print setting screen 31.

[Effect of the First Embodiment]

According to the printer driver 23 as described above, the shared printing condition set in the shared setting tab 34 of the print setting screen 31 and the identification information of the application 22 giving the instruction to display the print setting screen 31 are stored in the storage section 15 while being correlated with each other. In a case that the display of the print setting screen 31 is instructed from another application 22 different from the application 22 identified by the identification information, the shared printing condition stored in the storage section 15 is set in the shared setting tab 34 of the print setting screen 31 displayed upon the instruction from the another application 22. Accordingly, the printer driver 23 can reduce a burden to the user when the printing is performed by the different applications 22 using the same printing condition.

Further, according to the printer driver 23, in a case that the user does not desire to share the shared printing condition, the printer driver 23 is capable of preventing the shared printing condition from being shared by closing the application 22 identified by the identification information correlated with the shared printing condition.

Further, according to the printer driver 23, in a case that the shared printing condition stored in the storage section 15 is shared, the printer driver 23 is capable of preventing the shared printing condition from being changed.

Further, the printer driver 23 is capable of deleting the shared printing condition by closing the application 22 identified by the identification information correlated with the shared printing condition. Accordingly, in a case that the sharing of the shared printing condition is unnecessary, it is possible to end the sharing the shared printing condition easily just by closing the application 22.

Further, according to the printer driver 23, since the print setting screen 31 includes at least the basic setting tab 32 and the shared setting tab 34 separately, the user is capable of identifying the shared printing condition and the printing condition other than the shared printing condition easily in the print setting screen 31.

[Second Embodiment]

Figure 8:
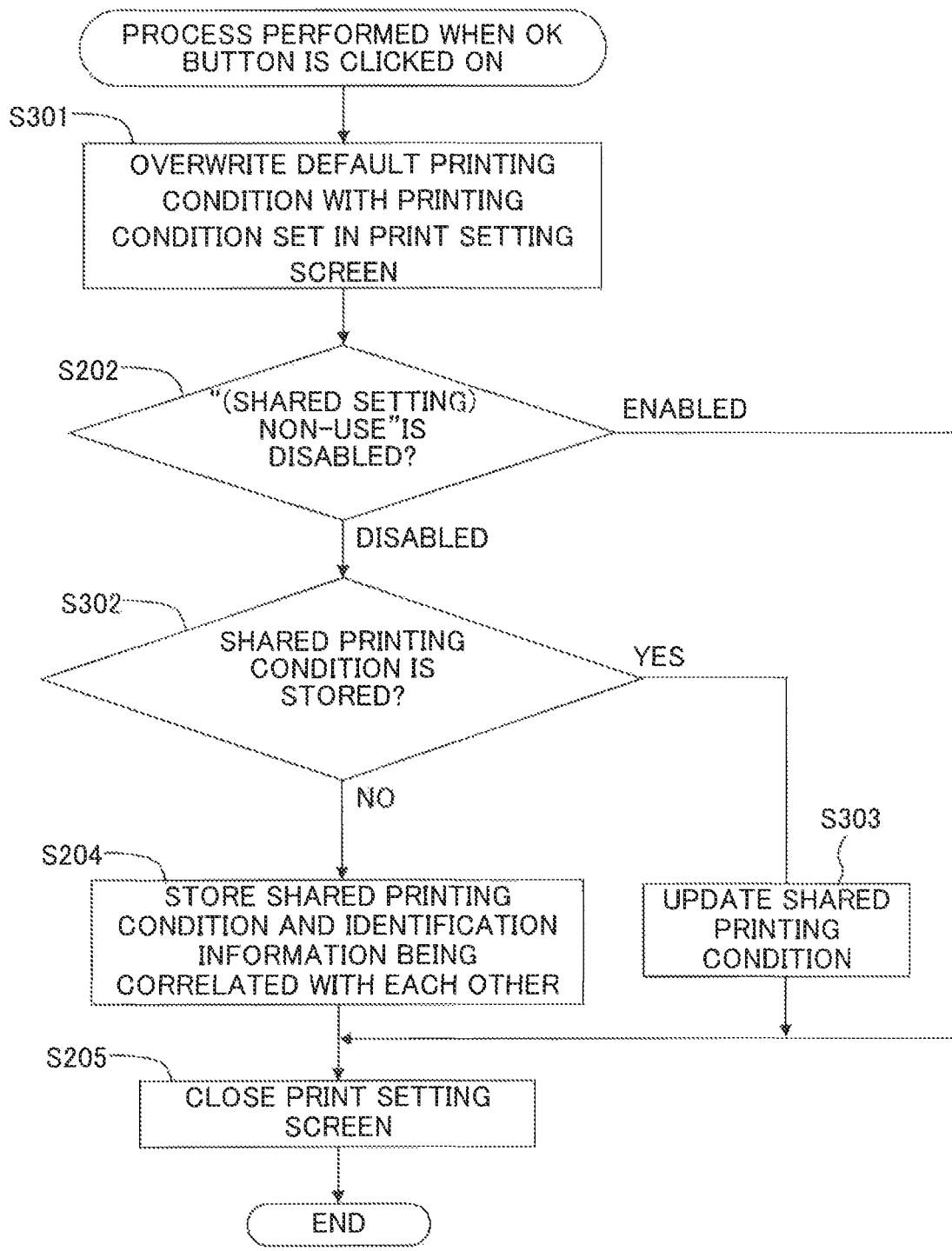
FIG. 8 is a flowchart showing a process of the printer driver when the OK button is clicked on the print setting screen according to the second embodiment.

Subsequently, an explanation will be made about the second embodiment with reference to FIG. 8. According to the printer driver 23 of the first embodiment, in a case that the display of the print setting screen 31 is instructed from the application 22, which is different from the application 22 storing the shared printing condition in the storage section 15, the shared setting tab 34 is displayed grayed-out and thereby the change of the shared printing condition is prohibited. On the other hand, according to the printer driver 23 of the second embodiment, the shared setting tab 34 is not grayed-out in the above case, and the change of the shared printing condition from the user is accepted.

<Shared Printing Screen>

Figure 3:
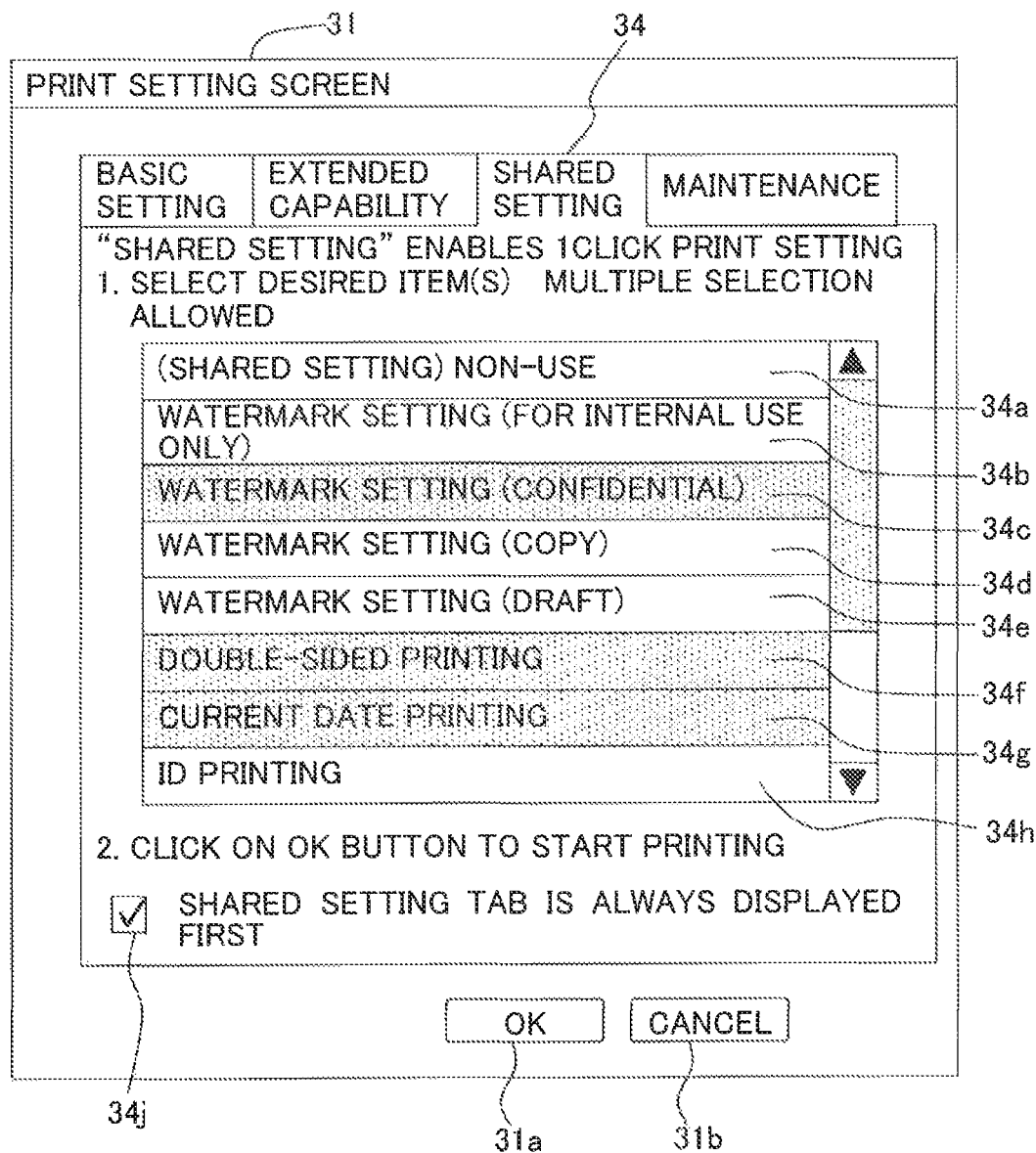
FIG. 3 schematically shows a shared setting tab.

In the second embodiment, in the case that the display of the print setting screen 31 is instructed from the application 22, which is different from the application 22 storing the shared printing condition in the storage section 15, the shared setting tab 34 is displayed similarly to the example shown in FIG. 3. Only the cancellation of the sharing of the printing condition included in the shared printing condition set in the shared setting tab 34 can be executed by the user in the shared setting tab 34. In particular, the enabled printing condition is merely disabled. Therefore, the user is not capable of enabling the disabled printing condition. That is, in the display process of the print setting screen in the second embodiment, instead of the process of S107 in the first embodiment, only the shared printing condition set in the disabled state is prohibited to be changed and the process is completed. Accordingly, the shared setting tab 34 is displayed in a state that the shared printing condition stored in the storage section 15 is enabled. The process for accepting the cancellation of the sharing is an example of a change accepting process.

<Process Performed when OK Button is Clicked on Print Setting Screen>

Subsequently, with reference to FIG. 8, an explanation will be made about a process of the printer driver 23 performed when the OK button 31*a* is clicked on the print setting screen 31 according to the second embodiment. The processes, which are the same as or equivalent to those of the first embodiment, are designated by the same reference numerals, any explanation of which will be omitted as appropriate.

In S301, the printing condition stored in the RAM 12 is overwritten with the printing condition set in the print setting screen 31 by the printer driver 23. In this situation, in a case that there is a printing condition, of the printing conditions included in the shared printing condition, the sharing of which has been canceled, the printing condition is changed in the disabled state and then is overwritten.

In S302, the printer driver 23 judges as to whether or not the shared printing condition is stored in the storage section 15. In a case that the shared printing condition is stored in the storage section 15, the process proceeds to S303. In a case that the shared printing condition is not stored in the storage section 15, the process proceeds to S204.

In S303, the shared printing condition stored in the storage section 15 is updated by being overwritten with the shared printing condition set in the shared setting tab 34 by the printer driver 23. Accordingly, the change, which has been executed in the shared setting tab 34 of the print setting screen 31 displayed upon the instruction from the application 22 which is different from the application 22 storing the shared printing condition in the storage section 15, is reflected in the shared printing condition stored in the storage section 15. S303 is an example of an update process.

However, the identification information is not overwritten and not updated by the printer driver 23. Thus, the identification information stored in the storage section 15 is not changed, and the identification information of the application 22 storing the shared setting condition in the storage section 15 is stored as it is.

[Effect of the Second Embodiment]

According to the printer driver 23 of the second embodiment, in a case that there is a printing condition, of the printing conditions included in the shared printing condition stored in the storage section, which is not desired to be shared by different applications, the printing condition can be prevented from being shared by disabling the printing condition which is not desired to be shared.

Further, according to the printer driver 23 of the second embodiment, since the shared printing condition stored in the storage section 15 is updated by being overwritten with the shared printing condition changed in the shared setting tab 34, the shared printing condition after the change can be shared by the different applications 22.

[Third Embodiment]

Subsequently, an explanation will be made about the third embodiment. The third embodiment is a modified embodiment of the second embodiment. According to the printer driver 23 of the second embodiment, in S303 of FIG. 8, the shared printing condition stored in the storage section 15 is updated by being overwritten with the shared printing condition changed in the shared setting tab 34. The identification information of the application 22, however, is not overwritten and not updated. On the other hand, according to the printer driver 23 of the third embodiment, it is executed, instead of S303, a process in which the shared printing condition is overwritten and further the identification information is updated by being overwritten with the identification information of the application 22 giving the instruction to display the print setting screen 31 in which the shared printing condition has been changed. All other processes of the third embodiment are substantially the same as those of the second embodiment.

According to the printer driver 23 of the third embodiment, the identification information stored in the storage section 15 is updated by being overwritten with the identification information of another application 22. Accordingly, even when the application 22 storing the shared printing condition first is not in execution, it is possible to share the shared printing condition provided that the application 22 by which the shared printing condition has been changed is in execution.

[Fourth Embodiment]

Subsequently, an explanation will be made about the fourth embodiment. The fourth embodiment is a modified embodiment of the second embodiment. According to the printer driver 23 of the second embodiment, in S303 of FIG. 8, the shared printing condition stored in the storage section 15 is updated by being overwritten with the shared printing condition changed in the shared setting tab 34. On the other hand, according to the printer driver 23 of the fourth embodiment, the change of the shared printing condition is accepted, but the shared printing condition stored in the storage section 15 is not updated and not overwritten with the shared printing condition, which has been changed in the shared setting tab 34 and accepted by the printer driver 23. Then, the process proceeds to S205.

That is, the shared printing condition changed in the shared setting tab 34 is used only in the application 22 giving the instruction to display the print setting screen 31 in which the change of the shared printing condition has been performed. The shared printing condition changed in the shared setting tab 34 is not shared by different applications 22.

According to the printer driver 23 of the fourth embodiment, in a case that the shared printing condition is changed, the shared printing condition after the change can be prevented from being shared by the different applications 22.

[Fifth Embodiment]

Figure 9:
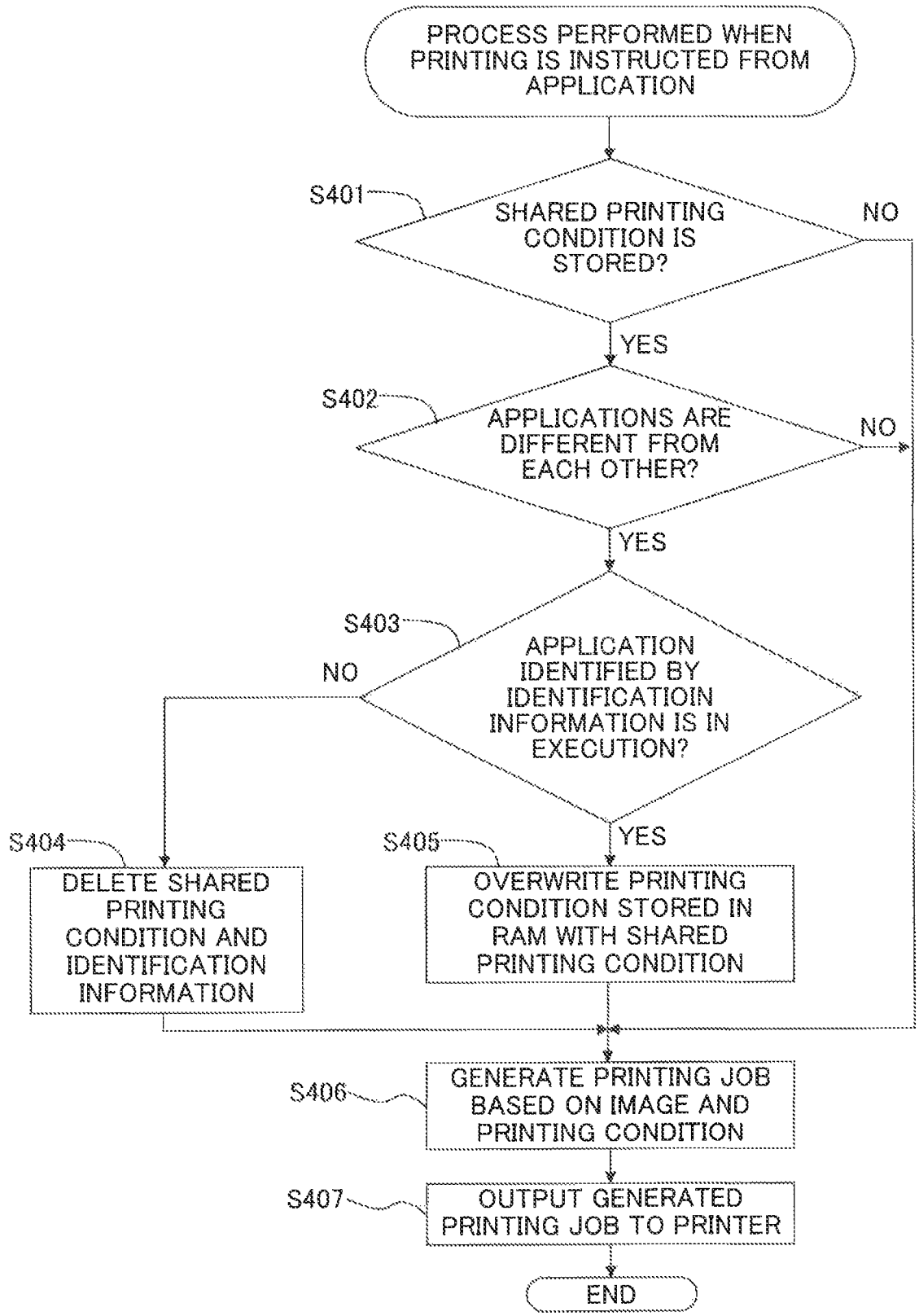
FIG. 9 is a flowchart showing a process of the printer driver when printing is instructed from an application according to the fifth embodiment.

Subsequently, an explanation will be made about the fifth embodiment with reference to FIG. 9. In the first embodiment, the shared printing condition stored in the storage section 15 is shared in a case that the display of the print setting screen 31 is instructed in the display process (FIG. 6) of the print setting screen 31.

On the other hand, according to the printer driver 23 of the fifth embodiment, in addition to the case in which the display of the print setting screen 31 is instructed, the shared printing condition is shared also when the printing is instructed from the application 22. In particular, the printing condition stored in the RAM 12 is overwritten with the shared printing condition stored in the storage section 15 also when the printing is instructed from the application 22. The printer driver 23 according to the fifth embodiment executes processes shown in FIG. 9 including a few more processes in addition to the processes in the first embodiment. Accordingly, the shared printing condition can be shared without displaying the print setting screen 31.

<Process Performed when Printing is Instructed from Application>

An explanation will be made about a process of the printer driver 23 performed when the printing is instructed from the application 22 with reference to FIG. 9. This process is started when the printing is instructed from the application 22 to the printer driver 23. A process, in which the printer driver 23 accepts the instruction of the printing from the application 22, is an example of a printing instruction accepting process.

In S401, the printer driver 23 judges as to whether or not the shared printing condition is stored in the storage section 15. In a case that the shared printing condition is stored in the storage section 15, the process proceeds to S402. In a case that the shared printing condition is not stored in the storage section 15, the process proceeds to S406. S401 is an example of a second storage judgment process. In S402, the printer driver 23 judges as to whether or not the application 22 instructing the printer driver 23 to perform the printing is different from the application 22 identified by the identification information correlated with the shared printing condition stored in the storage section 15. In a case that these applications 22 are different from each other, the process proceeds to S403. In a case that these applications 22 are the same application, the process proceeds to S406.

In S403, the printer driver 23 judges as to whether or not the application 22 identified by the identification information correlated with the shared printing condition is in execution. In a case that the application 22 is not in execution, the process proceeds to S404. In a case that the application 22 is in execution, the process proceeds to S405. S403 is an example of the execution judgment process. In S404, the printer driver 23 deletes the shared printing condition and the identification information stored in the storage section 15. S404 is an example of the deletion process.

In S405, the printing condition stored in the RAM 12 is overwritten with the shared printing condition stored in the storage section 15 by the printer driver 23. Here, in the fifth embodiment, it is possible to perform the display process of the print setting screen 31 according to the first embodiment. Thus, in some cases, the user carries out the instruction to display the print setting screen 31 from the application 22 before carrying out the instruction to perform the printing by the application 22, and clicks on the OK button 31a in the displayed print setting screen 31. In this case, the printing condition stored in the RAM 12 has already been overwritten with the shared printing condition. Therefore, in a case that S405 is executed, the printing condition stored in the RAM 12 is doubly overwritten with the shared printing condition. However, in some cases, the user carries out the instruction to perform the printing from the application 22 without carrying out the instruction to display the print setting screen 31. In this case, in S405, the printing condition stored in the RAM 12 is overwritten with the shared printing condition for the first time. S405 is an example of the shared printing condition setting process.

In S406, the printer driver 23 generates a printing job based on an image outputted from the application 22 and the printing condition stored in the RAM 12. In S407, the printer driver 23 outputs the printing job generated in S406 to the printer 2.

[Effect of the Fifth Embodiment]

According to the printer driver 23 of the fifth embodiment, the shared printing condition set in the shared setting tab 34 and the identification information of the application 22 giving the instruction to display the print setting screen 31 are stored in the storage section 15 while being correlated with each other. In a case that the printing instruction is performed from the application 22 which is different from the application 22 identified by the identification information, the shared printing condition stored in the storage section 15 is set as the printing condition. Accordingly, the printer driver 23 can reduce the burden to the user when the printing is performed by the different applications 22 using the same printing condition.

According to the printer driver 23 of the fifth embodiment, in a case that the user does not desire to share the shared printing condition stored in the storage section 15, the shared printing condition can be prevented from being shared by carrying out the instruction to perform the printing from the application 22 after closing the application 22, which is identified by the identification information stored while being correlated with the shared printing condition.

[Other Embodiments]

The present teaching is not limited to the embodiments explained through the above descriptions and drawings, but, for example, the following embodiments are also included in the technical scope of the present teaching.

In the above embodiments, the explanation was made with the example of the storage section 15 as a predetermined storage section. However, the predetermined storage section may be the RAM 12 or a storage section provided for a file server connected to the communication network 5.

In the above embodiments, the explanation was made with the following example. That is, even when the shared printing condition is stored in the storage section 15, in a case that the application 22, which is identified by the identification information correlated with the shared printing condition, is not in execution, the shared printing condition is not set in the shared setting tab 34. However, in a case that the shared printing condition is stored in the storage section 15, irrespective of whether the application 22 identified by the identification information correlated with the shared printing condition is in execution, the shared printing condition may be always set in the shared setting tab 34. In this case, item(s) for deleting and/or rewriting the shared printing condition stored in the storage section 15 may be provided in the print setting screen 31.

In the second embodiment, the explanation was made with the example of the case in which only the cancellation of the sharing can be executed by the user in the shared setting tab 34 in which the shared printing condition has been set. That is, the explanation was made with the example of the case in which only the process for disabling the enabled printing condition can be performed by the user. However, the disabled printing condition may be enabled by the user.

In the above embodiments, the explanation was made with the example of the case in which the shared printing condition is deleted from the storage section 15 in a case that the application 22 identified by the identification information is not in execution. On the other hand, for example, the following case is also allowable. That is, a button, through which the user carries out the instruction to delete the shared printing condition, is provided in the print setting screen 31, and the deletion is executed when the button is clicked on. Alternatively, the following configuration is also allowable. That is, an application for deleting the shared printing condition from the storage section 15 is prepared separately, and in a case that the shared printing condition stored in the storage section 15 is unnecessary, the shared printing condition is deleted from the storage section 15 by executing the application by the user.

In the fifth embodiment, the explanation was made with the example of the case in which the display process of the print setting screen 31 according to the first embodiment can be executed. However, the display process of the print setting screen 31 according to the first embodiment may not be executed in the fifth embodiment. In this case, according to the print setting screen 31 of the fifth embodiment, in a case that the display of the print setting screen 31 is instructed from the application 22 which is different from the application 22 storing the shared printing condition in the storage section 15, the shared printing condition stored in the storage section 15 is not set in the shared setting tab 34. That is, in this case, the printing condition stored in the RAM 12 is overwritten with the shared printing condition for the first time when the printing is instructed from the application 22.

In the above embodiments, the explanation was made with the example of the PC 1 as the information processing apparatus and the print control apparatus. However, the information processing apparatus may be a mobile phone or a mobile information terminal such as a tablet terminal.

What is claimed is:

1. A non-transitory computer-readable medium storing computer-executable instructions that, when executed by a processor, cause an information processing apparatus configured to be communicable with a printing apparatus, to:

perform a display process for displaying a print setting screen on a display section provided for the information processing apparatus, in a case that a display instruction of the print setting screen is outputted by a first application program executed by the information processing apparatus;

perform a storage judgment process for judging whether a shared printing condition, which is a printing condition shared by different application programs, is stored in a predetermined storage section, in the case that the display instruction of the print setting screen is outputted by the first application program;

perform a shared printing condition accepting process for accepting setting of a new shared printing condition in the print setting screen, in a case that it is judged in the storage judgment process that the shared printing condition is not stored in the predetermined storage section;

perform a storage process for storing the new shared printing condition accepted in the shared printing condition accepting process and identification information of the first application program in the predetermined storage section being correlated with each other;

perform an application judgment process for judging whether a second application program identified by the identification information, which is stored in the predetermined storage section being correlated with the shared printing condition, is different from the first application program, in a case that it is judged in the storage judgment process that the shared printing condition is stored in the predetermined storage section; and perform a shared printing condition setting process for setting the shared printing condition stored in the predetermined storage section in the print setting screen based on a determination from the identification information in the application judgment process that the second application program is different from the first application program.

2. The medium according to claim 1,
wherein the instructions further cause the information processing apparatus to perform an execution judgment process for judging whether the second application program is in execution, in the case that it is judged in the application judgment process that the second application program is different from the first application program; and
in a case that it is judged in the execution judgment process that the second application program is not in execution, the instructions cause the information processing apparatus not to set the shared printing condition stored in the predetermined storage section in the print setting screen, in the shared printing condition setting process.

3. The medium according to claim 2, wherein the instructions further cause the information processing apparatus to perform a deletion process for deleting the shared printing condition stored in the predetermined storage section, in the case that it is judged in the execution judgment process that the second application program is not in execution.

4. The medium according to claim 1, wherein the instructions further cause the information processing apparatus to perform a change accepting process for accepting change of the shared printing condition set in the print setting screen in the shared printing condition setting process.

5. The medium according to claim 4, wherein the instructions cause the information processing apparatus to accept, in the change accepting process, only a cancellation of a printing condition included in the shared printing condition set in the print setting screen in the shared printing condition setting process.

6. The medium according to claim 4, wherein the instructions further cause the information processing apparatus to perform an update process for updating the shared printing condition stored in the predetermined storage section by overwriting with the shared printing condition which has been changed in the change accepting process.

7. The medium according to claim 6, wherein the instructions cause the information processing apparatus to update the identification information stored being correlated with the shared printing condition by overwriting with identification information of the first application program in the update process.

8. The medium according to claim 1, wherein the instructions further cause the information processing apparatus to perform a prohibition process for prohibiting change of the shared printing condition set in the print setting screen in the shared printing condition setting process.

9. The medium according to claim 1, wherein the print setting screen is configured to have a screen to accept setting of the shared printing condition and a screen to accept setting of a printing condition other than the shared printing condition separately.

10. A non-transitory computer-readable medium storing computer-executable instructions that, when executed by a processor, cause an information processing apparatus configured to be communicable with a printing apparatus, to:
perform a display process for displaying a print setting screen on a display section provided for the information processing apparatus, in a case that a display instruction of the print setting screen is outputted by a first application program executed by the information processing apparatus;
perform a first storage judgment process for judging whether a shared printing condition, which is a printing condition shared by different application programs, is stored in a predetermined storage section, in the case that the display instruction of the print setting screen is outputted by the first application program;
perform a shared printing condition accepting process for accepting setting of a new shared printing condition in the print setting screen, in a case that it is judged in the first storage judgment process that the shared printing condition is not stored in the predetermined storage section;
perform a storage process for storing the new shared printing condition accepted in the shared printing condition accepting process and identification information of the first application program in the predetermined storage section being correlated with each other;
perform a printing instruction accepting process for accepting the printing instruction from the first application program;
perform a second storage judgment process for judging whether the shared printing condition is stored in the predetermined storage section, in a case that the printing instruction is accepted in the printing instruction accepting process;
perform an application judgment process for judging whether a second application program identified by the identification information stored in the predetermined storage section being correlated with the shared printing condition is different from the first application program, in a case that it is judged in the second storage judgment process that the shared printing condition is stored in the predetermined storage section; and
perform a shared printing condition setting process for setting the shared printing condition stored in the predetermined storage section as a printing condition based on a determination from the identification information in the application judgment process that the second application program is different from the first application program.

11. The medium according to claim 10,
wherein the instructions further cause the information processing apparatus to perform an execution judgment process for judging whether the second application program is in execution, in the case that it is judged in the application judgment process that the second application program is different from the first application program; and
in a case that it is judged in the execution judgment process that the second application program is not in execution, the instructions cause the information processing apparatus not to set the shared printing condition stored in the predetermined storage section as the printing condition in the shared printing condition setting process.

12. The medium according to claim 11, wherein the instructions further cause the information processing apparatus to perform a deletion process for deleting the shared printing condition stored in the predetermined storage section, in the case that it is judged in the execution judgment process that the second application program is not in execution.

13. The medium according to claim 10, wherein the print setting screen is configured to have a screen to accept setting of the shared printing condition and a screen to accept setting of a printing condition other than the shared printing condition separately.

14. A print control apparatus configured to be communicable with a printing apparatus, comprising:
a display section; and
a processing section configured to perform:
- a display process for displaying a print setting screen on the display section, in a case that a display instruction of the print setting screen is outputted by a first application program executed by the print control apparatus;
- a storage judgment process for judging whether a shared printing condition, which is a printing condition shared by different application programs, is stored in a predetermined storage section, in the case that the display instruction of the print setting screen is outputted by the first application program;
- a shared printing condition accepting process for accepting setting of a new shared printing condition in the print setting screen, in a case that it is judged in the storage judgment process that the shared printing condition is not stored in the predetermined storage section;
- a storage process for storing the new shared printing condition accepted in the shared printing condition accepting process and identification information of the first application program in the predetermined storage section being correlated with each other;
- an application judgment process for judging whether a second application program identified by the identification information, which is stored in the predetermined storage section being correlated with the shared printing condition, is different from the first application program, in a case that it is judged in the storage judgment process that the shared printing condition is stored in the predetermined storage section; and
- a shared printing condition setting process for setting the shared printing condition stored in the predetermined storage section in the print setting screen based on a determination from the identification information in the application judgment process that the second application program is different from the first application program.

15. A print control apparatus configured to be communicable with a printing apparatus, comprising:
a display section and
a processing section configured to perform:
- a display process for displaying a print setting screen on the display section, in a case that a display instruction of the print setting screen is outputted by a first application program executed by the print control apparatus;
- a first storage judgment process for judging whether a shared printing condition, which is a printing condition shared by different application programs, is stored in a predetermined storage section, in the case that the display instruction of the print setting screen is outputted by the first application program;
- a shared printing condition accepting process for accepting setting of a new shared printing condition in the print setting screen, in a case that it is judged in the first storage judgment process that the shared printing condition is not stored in the predetermined storage section;
- a storage process for storing the new shared printing condition accepted in the shared printing condition accepting process and identification information of the first application program in the predetermined storage section being correlated with each other;
- a printing instruction accepting process for accepting the printing instruction from the first application program;
- a second storage judgment process for judging whether the shared printing condition is stored in the predetermined storage section, in a case that the printing instruction is accepted in the printing instruction accepting process;
- an application judgment process for judging whether a second application program identified by the identification information, which is stored in the predetermined storage section being correlated with the shared printing condition, is different from the first application program, in a case that it is judged in the second storage judgment process that the shared printing condition is stored in the predetermined storage section; and
- a shared printing condition setting process for setting the shared printing condition stored in the predetermined storage section as a printing condition based on a determination from the identification information in the application judgment process that the second application program is different from the first application program.

* * * * *